US 9,441,614 B2

(12) United States Patent
Olesen (10) Patent No.: US 9,441,614 B2
(45) Date of Patent: Sep. 13, 2016

(54) WIND ENERGY POWER PLANT EQUIPPED WITH AN OPTICAL VIBRATION SENSOR

(75) Inventor: Ib Svend Olesen, Randers (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 876 days.

(21) Appl. No.: 13/634,533

(22) PCT Filed: Mar. 10, 2011

(86) PCT No.: PCT/DK2011/050075
§ 371 (c)(1),
(2), (4) Date: Nov. 26, 2012

(87) PCT Pub. No.: WO2011/110179
PCT Pub. Date: Sep. 15, 2011

(65) Prior Publication Data
US 2013/0078095 A1    Mar. 28, 2013

Related U.S. Application Data

(60) Provisional application No. 61/313,344, filed on Mar. 12, 2010.

(30) Foreign Application Priority Data

Mar. 12, 2010    (GB) .................................. 1004162.2

(51) Int. Cl.
*G01B 9/02*     (2006.01)
*F03D 11/00*    (2006.01)
(Continued)

(52) U.S. Cl.
CPC .......... *F03D 11/0091* (2013.01); *F03D 7/022* (2013.01); *F03D 7/0224* (2013.01);
(Continued)

(58) Field of Classification Search
CPC .. F03D 11/0091; F03D 7/022; F03D 7/0224; F03D 7/043; G01H 9/00; F05B 2270/334; F05B 2270/804; Y02E 10/722; Y02E 10/723; G01B 9/02003; G01B 9/02007; G01M 11/08
USPC .......................................................... 356/450
See application file for complete search history.

(56) References Cited

U.S. PATENT DOCUMENTS 4,912,530 A    3/1990    Bessho
5,784,161 A *  7/1998    Bechstein ................ G01J 9/04
                                                      356/487

(Continued)

FOREIGN PATENT DOCUMENTS

EP    1719910 A1    11/2006
EP    1748185 A1    1/2007

(Continued)

OTHER PUBLICATIONS

International Search Report dated May 7, 2011 for International Application No. PCT/DK2011/050075.

(Continued)

*Primary Examiner* — Tarifur Chowdhury
*Assistant Examiner* — Jonathon Cook
(74) *Attorney, Agent, or Firm* — Patterson + Sheridan LLP (57) ABSTRACT

A wind energy power plant optical vibration sensor is described, using two light sources 15, 16 that emit light at different respective frequencies. The light from the first light source falls on a surface 44 of the wind energy power plant at a detection site. Movements in the surface result in changes to the phase of the light reflected back from the surface which can be detected by mixing the first light with the light emitted from the second light source. The difference in frequencies between the two light sources results in a beating of the resulting interference signal, whereas movements in the sensor surface result in changes in the phase timing and frequency of the beats.

20 Claims, 8 Drawing Sheets

(51) Int. Cl.
  *F03D 7/02* (2006.01)
  *F03D 7/04* (2006.01)
  *G01H 9/00* (2006.01)

(52) U.S. Cl.
  CPC .............. *F03D 7/043* (2013.01); *G01H 9/00* (2013.01); *F05B 2270/334* (2013.01); *F05B 2270/804* (2013.01); *Y02E 10/722* (2013.01); *Y02E 10/723* (2013.01)

(56) References Cited

U.S. PATENT DOCUMENTS

| | | | |
|---|---|---|---|
| 6,052,186 A * | 4/2000 | Tsai | 356/484 |
| 6,301,968 B1 | 10/2001 | Maruyama et al. | |
| 2007/0286728 A1* | 12/2007 | Hotto | 416/1 |

FOREIGN PATENT DOCUMENTS

| | | |
|---|---|---|
| EP | 1816347 A1 | 8/2007 |
| EP | 2107352 A2 | 10/2009 |
| GB | 2466433 A | 6/2010 |
| JP | 01069922 A | 3/1989 |
| JP | 06117914 A | 4/1994 |
| WO | 2009121367 A1 | 10/2009 |

OTHER PUBLICATIONS

GB Search Report dated Sep. 10, 2010 for Application No. GB1004162.2.

* cited by examiner

WIND ENERGY POWER PLANT EQUIPPED WITH AN OPTICAL VIBRATION SENSOR

The present invention relates to a wind energy power plant, and in particular to a wind energy power plant having an optical vibration sensor.

Figure 1:
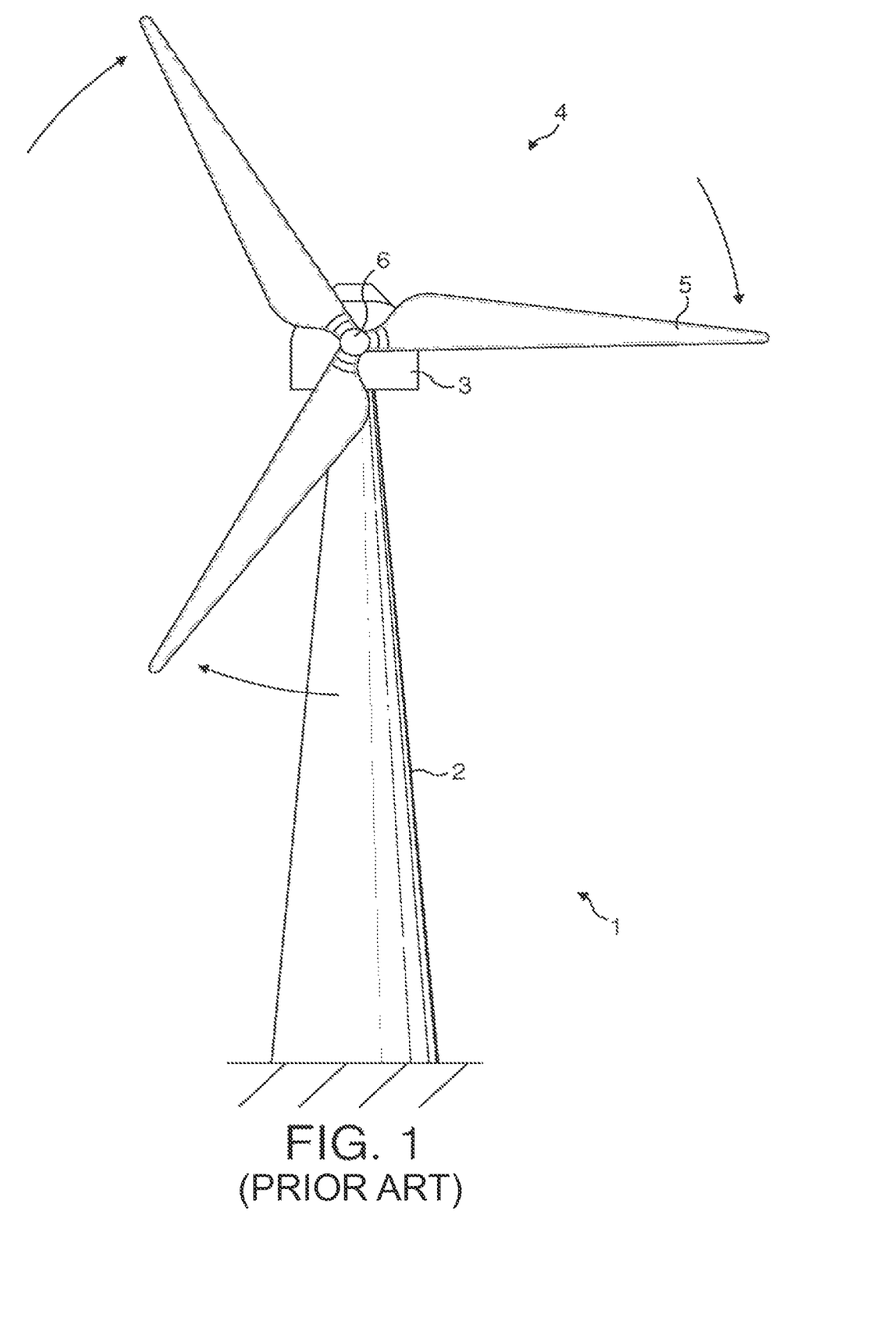
FIG. 1 is a schematic exterior view of a wind turbine.

FIG. 1 illustrates a wind energy power plant such as a wind turbine 1. The wind turbine 1 comprises a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm for example. In the latter case, the diameter of the rotor could be as large as 100 meters or more.

Wind turbines are typically located in remote areas, such as offshore, coastal, or elevated areas, which offer suitable wind conditions for the generation of electricity but where environmental conditions are accordingly harsh. Maintenance and repair of wind turbines is therefore essential to ensure that the wind turbines continue to reliably and efficiently generate electricity. In order to determine whether a wind turbine is operating correctly wind turbines are usually monitored by sensors that relay their findings via a centralised control system to a monitoring station. The dispatch of a service engineer carries a high overhead in terms of time and associated cost, and will only therefore be instructed when a sensor indicates that there is a problem that needs to be rectified.

Due to the height of most wind turbines, damage from lightning strikes is a recurring operational problem. The use of lighting conductors provides one way of drawing the energy from a lightning strike safely away from the struck component, which as a result may suffer minimal or no damage. However, lighting conductors will not always adequately protect sensor equipment, mounted on or in wind turbine components, which by reason of including metallic components such as wiring and circuits, is especially receptive to damage from an electrical discharge. For example, even if the sensor is not struck by lighting, it may be damaged by induced currents.

Figure 2:
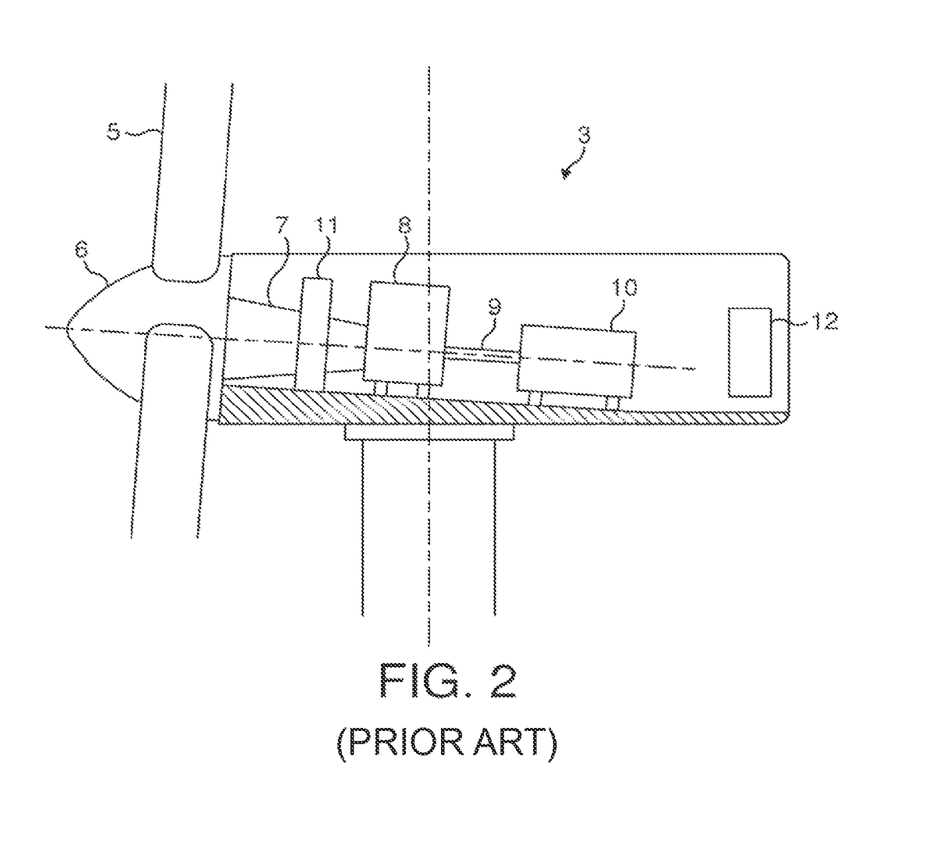
FIG. 2 is a schematic interior view of a wind turbine nacelle.

FIG. 2 illustrates a schematic view of the interior of the nacelle 3 in an example wind turbine, such as that shown in FIG. 1. A main drive shaft 7, supported by a main bearing 11 extends from the hub 6 and is received in a gear box 8. A secondary shaft 9 extends from the gear box 8 and into the generator 10. The nacelle 3 may also comprise a power converter, a transformer 12, as well as ancillary apparatus, such as control devices, sensors, heating and lighting units, hydraulic systems, cooling systems and so on.

Additionally, within the nacelle, the operation of sensors may be affected by the heavy electrical and mechanical machinery present, such as the generator 10 in particular. Although sensor damage from such machinery is unlikely, the sensor may not operate in an optimal way. We have therefore appreciated that there is a need for an improved sensor.

SUMMARY OF THE INVENTION

According to the invention in a first preferred embodiment, there is a provided a wind energy power plant having an optical vibration sensor, comprising: a first light source for emitting light at a first frequency, wherein in use the light emitted from the first light source is arranged to fall on the surface of a wind energy power plant component; a second light source for emitting light at a second frequency, wherein the first and second frequencies are different, and differ by a frequency df, and an optical coupler for receiving the emitted light from the first light source, after reflection from the surface of the wind energy power plant component, and for interfering the reflected light with the light emitted from the second light source to produce an output sensor interference signal; a detector for extracting from the output sensor interference signal the interference component of the signal that corresponds to the difference in frequency df, and based on changes in the difference in frequencies df, providing an output indicating movement of the wind energy power plant component surface.

The invention provides a sensitive sensor system due to the fact that small displacements of the sensor membrane can be detected using the arrangement of light sources and detector. Further, the sensor is relatively easy to install and can be situated in the wind turbine blade for protection, and to ensure that the presence of the sensor does not interfere with the measurement. As there are few moving parts, the sensor is resistant to extreme changes of temperature.

In one embodiment, the detector detects as the interference component the variation in df. A df signal can be output with a frequency in an appropriate range for detection by selection of the frequencies of the first and second light sources, and accordingly of the difference between them.

In an alternative embodiment, the detector detects as the interference component the difference in phase between the reflected light and the light emitted from the second light source.

In a further embodiment, the detector comprises a tracking device for tracking the amplitude envelope of the output sensor interference signal and outputting an electrical signal. The electrical signal can subsequently be analysed in a processor or detector and compared with sensor output readings previously detected and stored.

In one embodiment, the tracking device is a PIN diode. From the perspective of the PIN diode, the output sensor interference signal is a light signal, flashing at a frequency that indicates the difference in the first and second light frequencies. When the signal from the first light sources has been reflected from the wind energy power plant component surface, the variation in the frequency directly indicates movement of the surface. A PIN diode allows the frequency difference df to be easily detected and analysed. In a further embodiment, the wind energy power plant of any preceding claim, comprises: an optical coupler for receiving the light from the first light source, before reflection from the surface of the wind turbine component, and for interfering the light with the light emitted from the second light source to produce an output reference interference signal; and a comparator for comparing the output sensor interference signal with the output reference interference signal. Use of the reference interference signal allows small displacements of the surface to be measured in actual terms, and so provides a high precision sensor where displacements of the surface are expected to be small, such as in the nano to pico meter range. Where displacements of the surface are greater, the reference signal allows laser drift to be compensated and so improves the precision of the device.

The optical vibration sensor may comprise an electrically insulated housing containing at least the first and second light sources and the detector. This allows the components of the sensor that are vulnerable to electrical discharge, such as from lightning or from stray currents in the electrical machinery, to be protected. The purely optical, non-metallic and mechanical components of the sensor can then be deployed in locations that are susceptible to electrical discharge, such as on the exterior of the wind energy power plant, in particular on the wind turbine blades, or in the nacelle near to electrical components like the generator.

In one embodiment, the optical vibration sensor comprises: a sensor cavity; a sensor membrane, in the cavity and integral to the surface of the wind energy power plant component; at least a first optical fibre connected to the first light source and terminating in the sensor cavity, arranged such that light emitted from the first optical fibre is incident on the sensor membrane; and a light receiving optical fibre, being either the first optical fibre or a further optical fibre for receiving light that has been emitted from the first optical fibre and reflected from the sensor membrane.

The cavity allows a plurality of sensor membranes to be located at locations of interest in the wind energy power plant, by deploying a standardised sensor component. The cavity both allows for connection of the sensor system at the location of interest, and protection of the components.

In one aspect of the invention, the wind energy power plant component surface has at least one side that is exposed to the air outside of the wind energy power plant. In this example, the surface can therefore be the exterior surface of the component and the cavity can be located inside or outside the wind energy power plant. As wind flows over the outside surface of the wind energy power plant, movements of the surface can be detected by the sensor system.

Advantageously, the wind energy power plant component surface is that of one or more wind turbine blades. Wind turbine blades are subject to significant operational loads as they complete revolution after revolution under the influence of gravity. Further, they are prone to accumulation of ice and other particulate matter that may impair their performance, or pose a structural risk if not addressed.

In embodiments where the characteristics of the sensor are required to be different to those of the surface of the wind energy power plant component, the sensor membrane can be formed of a different material to that from which the surface of the wind energy power plant component is formed. This allows the sensor membrane to be tailored more precisely to its function as a sensor, in terms of tension and responsiveness. For example, a more sensitive indication of air turbulence can be obtained from a sensor membrane that is thinner and more responsive than the material from which the outside skin of the wind energy power plant is usually formed.

In one embodiment, a plurality of sensor cavities are provided on the windward and leeward sides of the one or more wind turbine blades. This allows the air flow and the structural conditions of the blades to be monitored at several locations, and the information to be used in a more sophisticated sensing system.

In one embodiment, for example, the system may comprise a processor and a memory for analysing the variations in the output sensor interference signal pattern over a predetermined period of time to determine whether the air flow over the wind energy power plant component surface is turbulent. In this embodiment the memory is arranged to record the output indicating movement of the wind energy power plant component surface over a period of time, and the processor is arranged to determine a condition of the component surface based on changes in the outputs over the time period. Depending on the pattern of the changes, the condition might indicate that ice or other particulate matter has accumulated, on the component surface, or indicate that the wind conditions for operating the wind energy power plant are no longer optimal.

In an alternative embodiment, the wind energy power plant has a nacelle, housing one or more electrical or mechanical components, and the surface of the wind energy power plant component is located in the interior of the nacelle.

This allows the operational condition of such electrical or mechanical components to be monitored. In particular, a processor and memory can be provided for storing the output indicating movement of the wind energy power plant component surface over time, and analysing the output to give an indication of the operating condition of at least one of the one or more electrical or mechanical components over the time period.

In one embodiment, the wind energy power plant comprises a controller for receiving data from the plurality of optical vibration sensors located on the wind turbine blades, and based on the detection of turbulent air flow controls an aerodynamic parameter of a wind turbine rotor blade. The invention therefore allows the aerodynamic interaction of the blade with the air flow to be monitored in real time, and adjusted as desired based on a measure of turbulence.

In one embodiment, the aerodynamic parameter is the pitch angle of the rotor blade. This offers a responsive and finely tuned rotor blade pitch control mechanism based both on the immediate aerodynamic conditions of the rotor blade. If the blade angle is too great, the turbulence sensors detect the resulting stall condition and the pitch controller reduces the pitch. This leads to improved electricity generation regime.

Preferably, the controller reduces the pitch of the rotor blade into the wind, when a predetermined number of sensors indicate turbulent air flow.

In alternative embodiments, the aerodynamic parameter is the shape of the rotor blade. Provision of suitable mechanisms to change the blade shape or adjust the flow of air past the blade can then be operated based on the sensor output to ensure that, to the extent possible, operating conditions are maintained according to pre-set desired values or ranges. The aerodynamic parameter may also be the air flow past the blade.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENTS

A wind energy power plant optical vibration sensor will now be described. The sensor has two light sources that emit light at different respective frequencies. The light from the first light source is arranged to fall on a surface of the wind energy power plant at a detection location that is being monitored, such as the surface of a wind turbine blade, or the surface of a component inside the nacelle. Movements in the surface result in changes to the phase of the light reflected back from the surface, and these changes can be detected by mixing the first light with the light emitted from the second light source. The difference in frequencies between the two light sources results in a beating of the resulting interference signal, whereas movements in the sensor surface result in changes in the phase timing and frequency of the beats.

Figure 3:
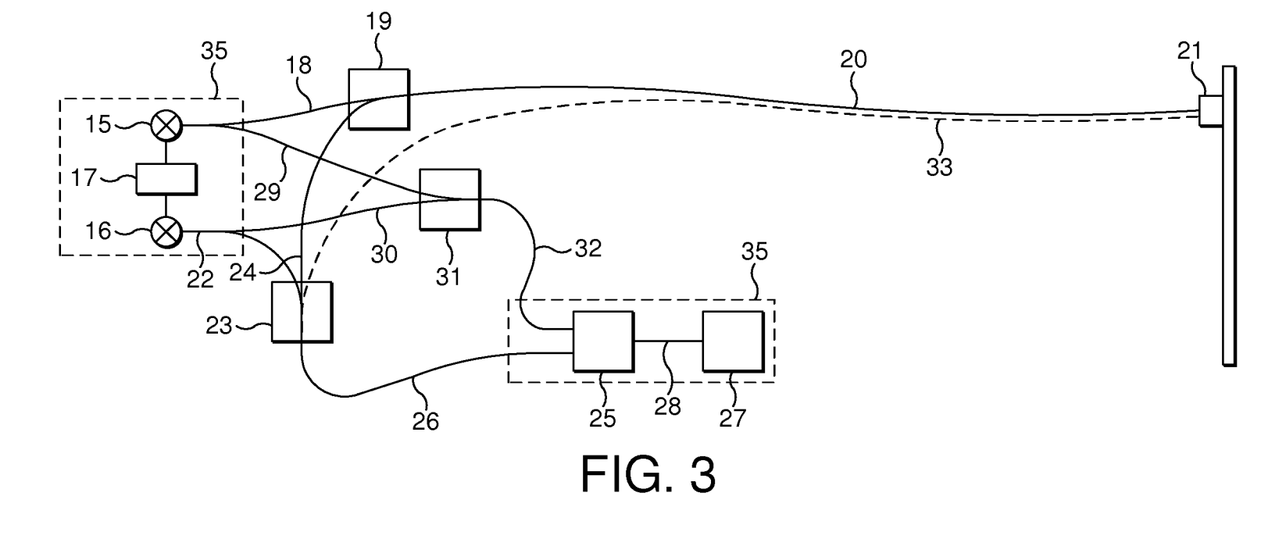
FIG. 3 illustrates a first example of a sensor according to the invention.

Reference should now be made to FIG. 3 which illustrates a first example embodiment of the invention. The sensor comprises a first 15 and a second light source 16 coupled to a light source controller 17. The light sources may include any suitable light source, such as tuneable lasers, photo-diodes and other opto-electronic sources.

The light output from the first light source 15 is input into a first optical fibre 18, coupled to a first optical element 19. The first optical element 19 is coupled in turn to second optical fibre 20 terminating at a vibrational sensor element 21. The sensor element is mounted at a detection site, such as a wind turbine blade or nacelle component.

The light from the second light source 16 is input into second optical fibre 22, coupled to second optical element, namely first optical coupler 23. The second optical element is further coupled to the first optical element 19 by third optical fibre 24, and to a opto-electronic light receiving device 25 by optical fibre 26. An electrical output signal from the opto-electronic light receiving device 25 is provided to detector 27 by electrical connection 28.

Additionally, light from both light sources 15 and 16 is coupled via respective optical fibres 29 and 30 to a third optical element, namely second optical coupler 31, which is in turn coupled to detector 25 by optical fibre 32.

In operation, light from the first light source travels along optical fibre 18 and 19 to the sensor element 21, where a characteristic of the light is affected by the conditions at the sensor. As will be described later, in the sensor the light from the first light source 15 falls upon a surface of the wind energy power plant component. Displacement or movement of the surface affect the incident light, causing a detectable change in the phase of the light in comparison to the unaffected light.

The light returning from the sensor element 21 will be referred to as sensor light signal as it contains a (phase-based) signal indicating information about the conditions at the sensor element 21. The light from the second light source 16, which has not been affected by environmental conditions at the sensor will have a phase timing that is consistent with the phase of the light emitted by the second light source 16.

The second light signal shall therefore be referred to as a reference light signal. The sensor light signal returns from the sensor 21 via optical fibre 20 to the optical element 19 where it is separately passed via optical fibre 24 to the second optical element, optical coupler 23.

Optical element 23 also receives the reference light signal directly from the second light source 16. The sensor light signal and the reference light signal interfere with one another in the second optical element 23 and are output into optical fibre 26 as a sensor interference signal. The sensor interference signal is subsequently received by the opto-electronic light receiving device 25, where it is turned into an electrical signal for output to electrical connection 28. The signal is subsequently passed to the detector 27 for analysis.

The light from the first and second sources 15 and 16 is also passed directly via optical fibres 29 and 30 to the third optical element, the second optical coupler 31, where the two light signals are allowed to interfere. At the third optical element 31, the light from the first light source 15 has not been modulated by the conditions at the sensor 21 and therefore contains no information about the sensor state. Further, its phase timing is also substantially consistent with that of the light emitted by the light source 15.

The interference signal output by the third optical element 31 is therefore a product of the two unmodulated or reference light signals from the first and second light sources 15 and 16, and shall be referred to as a reference interference signal. The reference interference signal is output into optical fibre 32 and received by the opto-electronic light receiving device 25, where it is turned into an electrical signal for output to electrical connection 28. The signal is subsequently passed to the detector 27 for analysis.

It is advantageous if the elements that are susceptible to damage from stray electrical currents are provided with electrical protection. For this reason, the first and second light sources 15 and 16, and the light source controller 17, as well as the opto-electronic light receiver 25, the detector 27, and the electrical connection 28, are preferably located in electrically insulated or shielded housing 35.

In the example shown in FIG. 3, it is possible to avoid the use of the first optical element 19 by providing a separate return optical fibre connecting the sensor element 21 to the second optical element 23. In FIG. 3, this is shown by way of the dotted line 33 that bypasses the first optical element 19 and optical fibre 24 to make a direct connection with the optical element 23. Further, although the optical fibres 18 and 20, 22 and 26, 29 or 30 and 32 have been described as separate optical fibres, it will be appreciated that where appropriate they may be implemented as respective single fibres.

In an alternative embodiment, the reference interference signal can be omitted. Elements 29 to 32 are therefore optional depending on the implementation.

Figure 4:
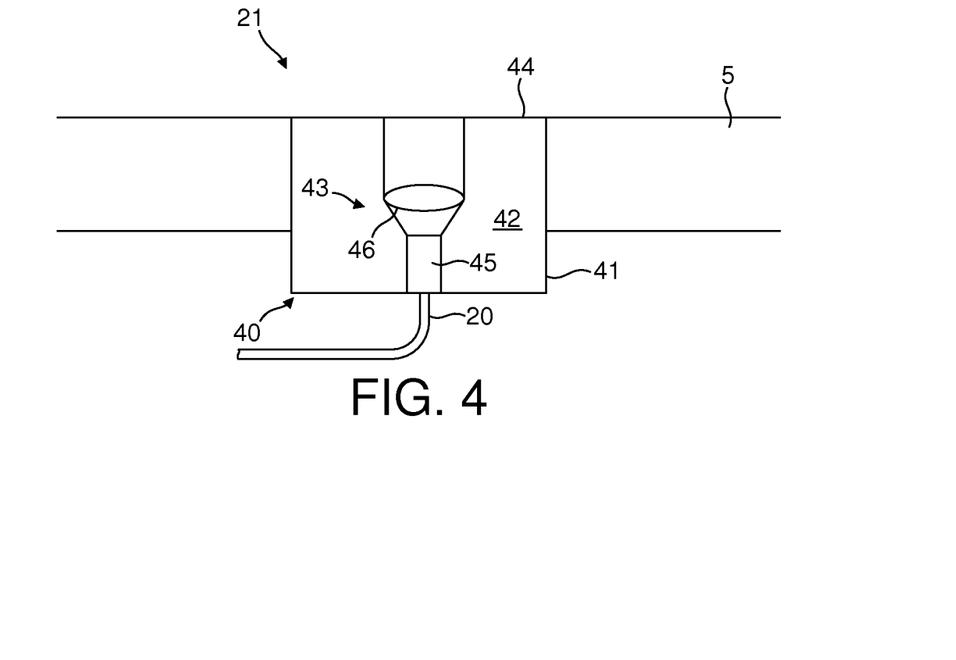
FIG. 4 illustrates a first example of the sensor element integrated into a wind turbine blade.

FIG. 4 illustrates the sensor element in more detail. In the example shown in FIG. 4, the vibrational sensor element 21 is integrated into the blade 5 of a wind turbine rotor. As noted above, the sensor could also be implemented in other wind turbine components, such as the hub, tower, nacelle, to determine the external flow of air across that component, or simply to monitor the component by means of the vibration of the sensor.

The sensor element 21 comprises a vibrational sensor housing 40, having side walls 41 that define a cavity 42. In the cavity 42, sensor apparatus, denoted generally by reference number 43, is situated. One surface of the sensor housing 40 is provided with a sensor membrane 44. In practice, the sensor 21 is mounted in the blade 5 such that the sensor membrane 44 separates the cavity 42 from the outside air, and such that the membrane 44 is in contact with the air flow across the surface of the blade. The cavity is entirely sealed off from the external environment by the side walls 41 and the membrane 44, so that movement of the membrane surface can be considered wholly attributable to variations in the air flow across the blade surface 5. Sealing the cavity also acts to keep the internal surface of the membrane clean, and allows the internal environment of the cavity to be regulated to avoid build up of moisture that could affect the sensor membrane 44 and apparatus 43. The cavity 42 may for example be filled with a gas other than air, such as an inert gas, that gives a better operating environment for the membrane.

Preferably, the blade surface 5 and the membrane 44 are arranged so that they form a smoothly continuous blade surface. It is undesirable both for the aerodynamic properties of the blade and for the sensitivity of the sensor if the connection between the membrane 44 and the blade surface is not continuous as this may introduce obstructions or impediments into the air flow.

The membrane 44 is arranged such that it is susceptible to changes in air flow at the surface of the wind turbine component. It is therefore relatively thin, in some embodiments between 0.5 and 2 mm, and is tensioned so that turbulent airflow will result in only a small movement of the membrane surface.

In practice, a range of movement of the membrane of the order of several μm has been found advantageous, owing to the wavelength of the light used. The choice of the membrane material is critical to ensure it is suitable for measurement. A material that is too light and flexible will be too sensitive to changes in air flow even in laminar conditions will not be suitable for distinguishing turbulent and laminar flow. Preferably, the material is therefore strong and stiff enough to ensure that only strong vibrations (in the range of 10 to 100 Hz, say) from turbulent air flow give a sufficient interference signal.

It is possible to use the outside surface of the rotor blade itself as the membrane 44. In this case, the sensor apparatus 43 can be installed in the rotor blade 5 under the outer surface, with or without the sensor housing 40 creating a sealed cavity for the apparatus. If the sensor 21 is installed into the rotor blade 5 or other wind turbine component, as a separate unit, then a hole of diameter 30 to 100 mm has been found adequate to accommodate the sensor housing 40 and apparatus 43.

The internal construction of the sensor apparatus 43 will now be explained in more detail. The sensor apparatus comprises an optical fibre mounting section 45 in which the end of the optical fibre 20 is received. As well as securing the optical fibre 20 in position inside the sensor housing 40, the mounting section 45 may provide an end surface for light emission that is larger than the end surface of the optical fibre 20.

The mounting section 45 ensures that the light is directed at the sensor membrane 44 perpendicularly so that the light reflected back from the sensor membrane 44 falls on the mounting section 45 and the end of optical fibre 20. The optical fibre 20 therefore acts as a receiver for light that is reflected back from the membrane 44.

In front of mounting section 45, an optional lens 46 receives the light from the mounting section 45 and focuses the light onto the sensor membrane 44. Additionally, the lens focuses the light received from the sensor membrane 44 onto the mounting section 45 and optical fibre 20.

In alternative embodiments, the lens can be omitted, but it is shown here as included as it helps to improve the amount of light received by the return optical fibre after reflection. In a first of such alternate embodiments, the optical fibre 20 is held by the mounting 45 close enough to the sensor membrane 44 for there to be little opportunity for significant amounts of light to escape from the edges. In this embodiment, the construction of the apparatus is simpler, but there may be damage to the optical fibre 20 or mounting section 45 if the sensor membrane 44 moves by too large a distance and makes contact with or otherwise applies pressure to the mounting section 45.

Figure 5:
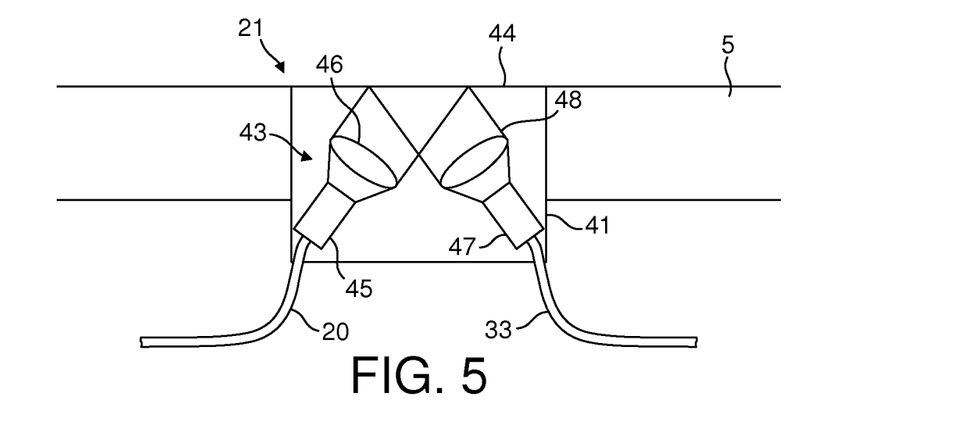
FIG. 5 illustrates a second example of the sensor element integrated into a wind turbine blade.

In an alternative embodiment shown in FIG. 5, the sensor apparatus 43 comprises a second optical fibre mounting section 47 securing the end of a receiving optical fibre, such as optical fibre 33, in place inside the sensor housing 41. The optical fibres 20 and 33 are then arranged not perpendicularly but at an angle so that the beam from one fibre 20 is reflected by the membrane 44 and is subsequently incident on the other fibre 33. The optical fibre 33 is then connected to the second optical element 23. In this embodiment also, optional lenses 46 and 48 can be used to focus the light.

Other suitable arrangements of sensor 21 could also be implemented and will occur to the skilled person.

In operation, the two light sources 15 and 16 are controlled by the controller 17 so that they emit light of similar but slightly different frequencies. In one example, the wavelength of the laser is of the order of 1 μm, corresponding to a frequency of 300,000 GHz, and the difference in frequencies can be in the range of 100 MHz to 10 GHz.

The light from the first light source 15 is directed via the first optical fibres 18 and 20 to sensor element 21 where the light is allowed to fall on sensor membrane 44. The light reflected back from the sensor membrane 34 is transmitted by the optical fibre 20 or 33 towards second optical element 23 where it is mixed with the light emitted from the second light source 16.

Sensor element 21 described above in connection with FIGS. 4 and 5 operates in a similar fashion to a microphone. Changes in the position of the sensor membrane 44, caused either by air flow across the surface of the blade 5, or by vibrations in the blade 5 itself, will cause changes in the distance between the sensor membrane 44 and the mounting sections 45 and 47. The distance travelled by the light from the first light source, incident on the sensor membrane 44 and fed back to the second optical element 22 will therefore change, depending on the instantaneous position of the sensor membrane 44. This will also affect the phase of the sensor light signal in comparison to the reference light signal from the second light source 16.

Mixing the reflected (sensor) light from the first light source 15 and the non-reflected light from the second light source 16 in the second optical element 23 therefore results in an interference pattern, which is then output as the sensor interference signal to optical fibre 26. The interference pattern is due to the difference in frequency of the light from the two sources, and the difference in phase due to the different optical paths travelled by the light.

The interference pattern can be described as a superposition of waves of the first and second light signals according to the following formula:

$$\cos w1.t + \cos w2.t = 2 \cos \tfrac{1}{2}(w1+w2)t . \cos \tfrac{1}{2}(w1-w2)t$$

where w1 and w2 are the different frequencies of the light signals output by the first and second light source. Here w1 is taken as representing the actual frequency of the light emitted by the first light source 15, as well as any apparent shift in frequency resulting from the different phase timing of the light due to reflection at the sensor membrane 44.

The expression ½ (w1+w2) is therefore the average frequency, and if w1 and w2 are similar to each other, then the first term in the equation above will be approximately equal to either one of the original waves. The second term however will appear as a modulation of the first with a very low frequency, since if w1 and w2 are similar (w1−w2) will be small. The equation above can therefore be approximated to:

$$(A \cos w_{half-diff} t) \cdot \cos w_{av} t$$

Where $w_{av}$ indicates the average frequency and $w_{half-diff}$ indicates half of the difference between the two light signals. Due to the difference in magnitudes noted above, this will appear to be similar to the waveform indicated in FIG. 6, namely a higher frequency 'carrier signal' modulated by a low frequency envelope. This expression will be familiar as describing the phenomenon of 'beats' occurring between two waves of similar frequency.

In practice, the value of w1 appearing in the interference pattern will not be constant as it will be affected by the phase difference resulting from changes in the optical path length travelled by the light as the sensor membrane 44 moves. For example, if during the operation of the sensor, the membrane moves half of a wavelength 44 towards the optical fibre 20 or 33, then (during that the period where the membrane is moving) the phase of the reflected light is changed by an angle of 2π. If the wavelength of the light is 1 µm, and the membrane moves 100 µm in one tenth of a second from its initial position, then the output reflected light frequency is increased by 200 periods (double the distance of the membrane movement) in one tenth of a second, giving an apparent change in frequency in w1 of 2000 Hz.

Although, the effect of variations in w1 on the average signal $w_{av}$ will be small, the effect on the difference signal w1−w2 will be significant. These variations will manifest themselves as a detectable change in the frequency of the envelope or modulation of the carrier signal shown in FIG. 6. By extracting this envelope signal and comparing the instantaneous frequency value with the expected frequency (assuming w1 was constant), the movement and/or position of the sensor membrane 44 can be accurately deduced. It will be appreciated from the above discussion, that if the membrane is moving at a constant speed, the frequency of the envelope signal will be indicated by a constant value, different to the rest or reference value. However, if the membrane is experiencing an acceleration, then the frequency of the envelope or modulation of the carrier signal will be variable. In example embodiments of the invention, the absolute value of the envelope frequency, or indeed its rate of change, can therefore be used as sensor data variables in detector 27. From these variables, the displacement of the sensor membrane over time can also be calculated if desired.

Figure 7:
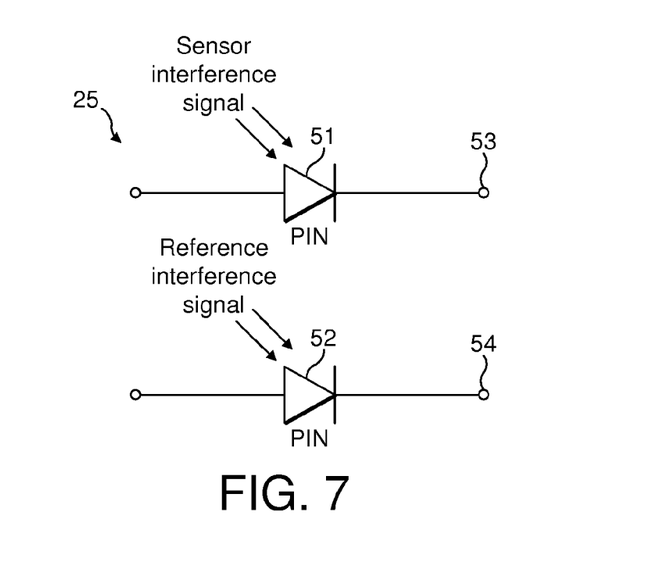
FIG. 7 is a schematic illustration of a light receiving device for converting the light signals into respective electrical signals.

As shown in FIG. 3, both the sensor interference signal and the reference interference signal are input into light receiving device 25 that converts the signals into a corresponding electrical signal for output to detector 27. In this example, the light receiving device 25 therefore comprises a photo-detector such as a PIN diode. A suitable arrangement is shown in FIG. 7 for both the sensor intreference light signal, and the reference interference light signal. In this embodiment, the reference interference signal and the sensor interference signal, are received at respective inputs, and converted using respective light sensors, PIN diodes 50 and 51, into respective electrical signals at output 53 and 54.

Figure 6:
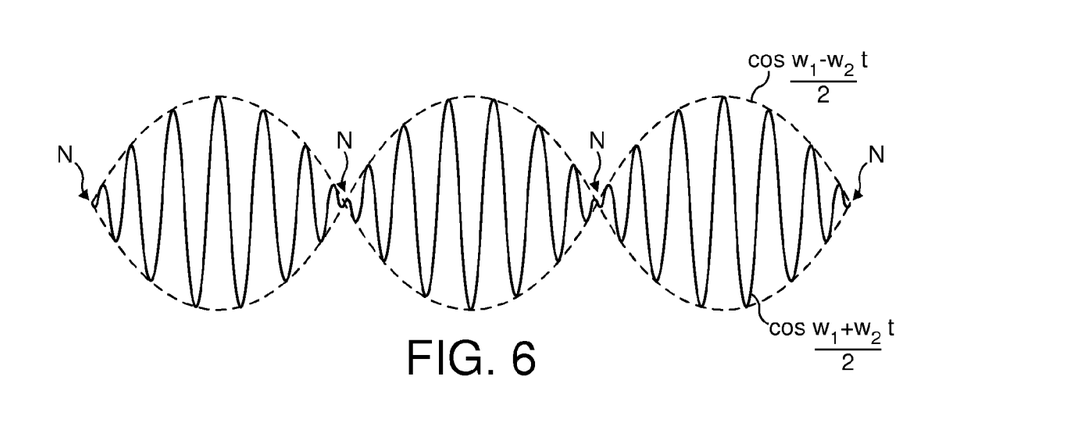
FIG. 6 illustrates an example light interference output signal from the sensor.

Other opto-electronic tracking devices may also be used, as will be appreciated by those skilled in the art It will be appreciated from FIG. 6 that, at times when the interference signal received by the light receiving device 25 is between nodes N, the photodetectors 50 and 51 will register a light signal and will conduct an electrical current. However, at times corresponding to the nodes N of the interference signals, there will be no light signal and therefore no conduction at the diode. The PIN diode effectively sees the interference patterns as a light signal, that is blinking with the frequency of the envelope, namely (w1−w2).

Thus, depending on the response of the PIN diodes 50 and 51 and their ability to accurately track the input light signal, the PIN diodes 50 and 51 will output electrical signals at output terminals 53 and 54, that are either substantially sinusoidal (corresponding closely to the variations in the magnitude of the input light signal of FIG. 6), or that is pulsed (where the PIN diode response is not able to follow the input so closely). In either case, the electrical output of the PIN diodes 50 and 51 will show a cyclical variation having a frequency that is identical or at least representative of the modulation frequency in the interference signals.

The frequency of this electrical signal output from terminal 53 of the PIN diode 50 is therefore used as a primary sensor signal for analysis in detector 27. The frequency of the electrical signal output from terminal 54 of the optional PIN diode 51 can be used as a reference signal. The detector 27 may therefore determine the frequency of both output signals from the light detector device 25.

As noted above, while the primary sensor signal has a constant frequency value, it can be deduced that the sensor membrane 44 is stationary or moving at constant speed. Furthermore, the magnitude of the sensor signal, which is dependent on the frequency (w1−w2), can be used to indicate the direction of motion of the membrane 44. A sensor signal with magnitudes greater than an equilibrium or rest value can be assumed to indicate motion of the sensor membrane 44 in a particular direction, while magnitudes that are smaller than the rest value can be assumed to indication motion in the opposite direction. In one embodiment, the equilibrium or rest value can be obtained by averaging the sensor interference signal over time, and storing the average frequency value result for comparison with the instantaneous frequency value.

In the example embodiments, such as that shown in 7, however, the frequency of the signal received at output terminal 54 is used to provide an electrical output signal indicative of the equilibrium value. This is advantageous as the frequency value of the reference interference signal will reflect changes in the temperature of the apparatus as well as drift in the frequency of the light sources. As these phenomena will affect the accuracy of the sensor interference signal, the use of the reference intreference signal serves to calibrate the sensor to any environmental changes that occur while it is operating.

Figure 8:
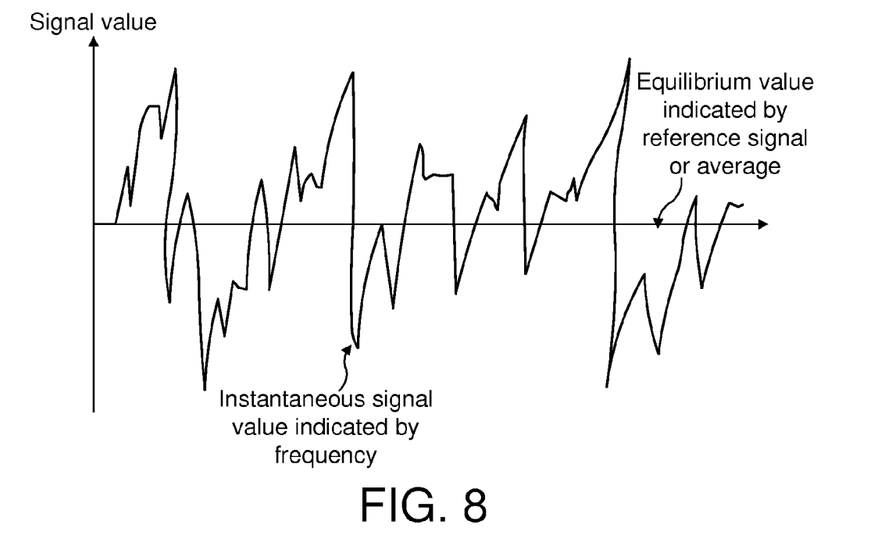
FIG. 8 is a illustration of the output of the sensor indicating frequency difference between the sensor interference and reference interference signals.

FIG. 8 is a line graph schematically illustrating a plot of the frequency of the primary sensor signal over time, in comparison to an equilibrium or rest signal value, determined either from an average of the primary signal, or using the reference signal. As mentioned earlier, it will be appreciated that the output resembles the output of an audio microphone.

The graph of FIG. 8 which is developed by the detector 27 can therefore be used to give an indication of the air flow conditions across the surface of the blade 5. Turbulent air flow will result in buffeting of the blade and the sensor membrane 44, and the corresponding graph of signal value will indicate frequent and chaotic movements of the membrane. This will be characterised by considerable variation of the signal, and relatively few periods where the intensity is essentially unchanging or is changing slowly. Further the variations themselves are likely to have higher frequencies, indicating faster movement of the membrane than at other times.

Laminar air flow or non-turbulent background conditions, on the other hand, will result in little or less movement of the membrane. In this case, the intensity graph would therefore be characterised by more and longer periods of flat lines or gentle variations.

The resulting signal can then be fed to an analysing and/or a controlling device that uses the achieved data for statistical and controlling purposes.

The sensor described above can detect very small vibrations affecting the sensor membrane 44, and can therefore be used as part of a diagnostic sensor system based on vibrations. In this regard, it may be thought of as an optical microphone, arranged to pick up the vibrations from the surrounding air. Furthermore, with the exception of the opto-electronic components, the sensor apparatus comprises mostly optical elements, and it can therefore be used in situations where electrical susceptibility is a problem.

One such situation is to monitor the health of the generator inside the nacelle, where electronic sensors would be affected by the strong associated magnetic and electrical fields. Generators that have developed or are developing faults are found to emit a different sounds to those that are operating normally. In a simple case, this might be the tell-tale sound that a bearing is damaged. By detecting and analysing the sound spectrum of the generator, problems that will impair operation can be identified in advance of an actual breakdown occurring.

Sensors such as that described above may be used elsewhere in the wind turbine, such as to monitor the rotor hub, gear train and so on. In particular, the sensor may be used near EMC noisy equipment, like high power converters, or as part of the Condition Monitoring System, replacing accelerometers that measure the vibrations on the surface of a gearbox or generator.

Figure 9:
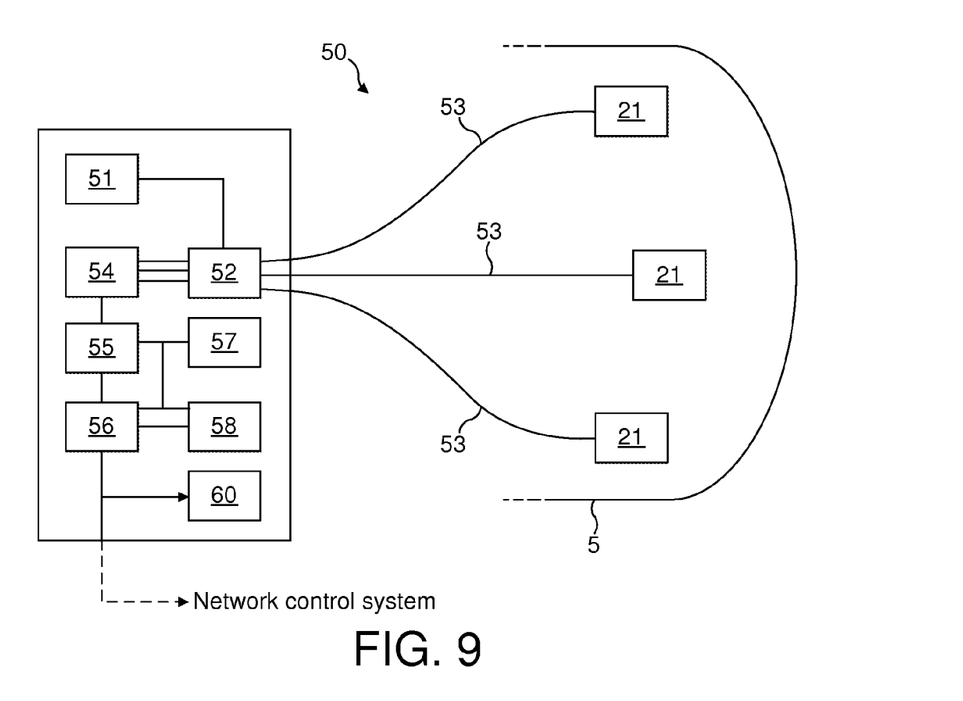
FIG. 9 is a schematic illustration of a blade condition monitoring system employing the sensor of FIGS. 3 and 4.

An embodiment will now be described with reference to FIG. 9, featuring use of the sensors described above in a blade condition monitoring system. The blade condition monitoring and control system 50 comprises one or more light sources 51, such as a laser or photo diodes, coupled to one or more optical devices 52. Optical fibres 53 are connected between the one or more optical mixers 52 and respective turbulence sensors 21 located at a wind turbine blade.

Optical device 52 contains the optical elements 19, 23 and where appropriate 31, and optical fibres 18 22, 26 29, 30, and 32 illustrated in FIG. 3. There may be respective sets of optical fibres and elements for each sensor 21, or alternatively, the same set of optical fibres and optical elements may be used for all of the sensors 21, with the light signals for each sensor being distinguished by wavelengths or by timing.

The optical vibration sensors 21 may for example be those illustrated in FIGS. 4 and 5 above, in which case fibres 53 correspond to fibres 20 and 33 as shown in the figures.

Figure 10:
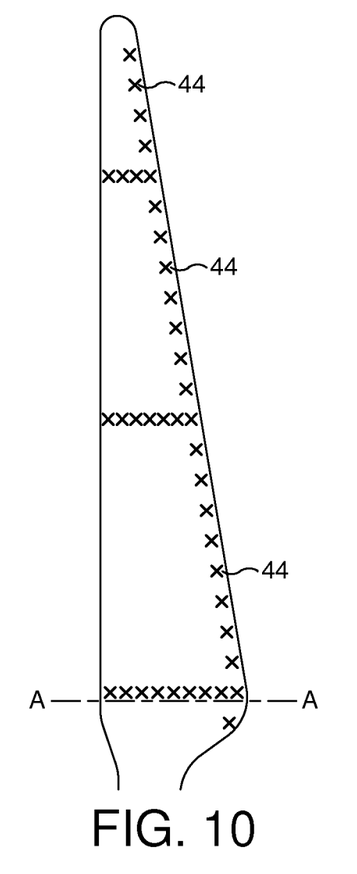
FIG. 10 is a longitudinal elevation of a wind turbine blade showing an example arrangement of the turbulence sensors in a pitch control system.
Figure 11:
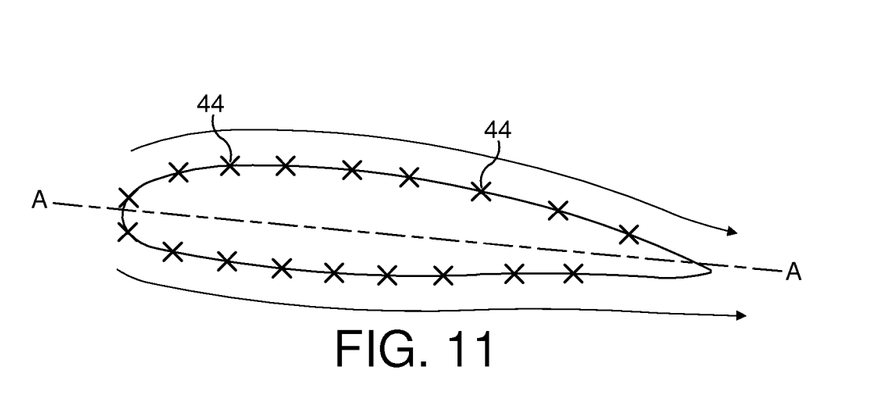
FIG. 11 is cross-sectional view through the line A-A in FIG. 10.

As shown in FIGS. 10 and 11, a plurality of sensors 21 are preferably distributed at a number of different locations across the leeward or windward surfaces of the wind turbine blades. The number of sensors per blade may be three or greater, per blade surface, for example. In this way, variations in air flow caused by accumulation of matter can be detected by comparison of the different signals. This will be explained in more detail below.

The optical mixer 52 is coupled to an opto-electronic light sensing device 54. For each optical vibration sensor 21, the opto-electronic light sensing device 54 receives at least two light signals, the first being the sensor interference signal and the second being the reference interference signal. The light sensor 54 is connected to a processor 55, which is connected to a system controller 56. Processor 55 and controller 56 preferably further have access to a timer unit 57 and a memory 58.

Many wind turbines, especially those installed in wind parks, are monitored and controlled by sophisticated control systems, such as the SCADA Supervisory Control and Data Acquisition system. It will therefore be appreciated that in practice, controller 56 will typically be connected to a larger control system, and may have access to data or information gathered at the wind turbine other than that received from the turbulence sensor. This need not always be the case however, such as where turbines are installed as stand-alone individual units.

Preferably the light source 51, the opto-electronic light sensor 54, the processor 55, controller 56, timer 57 and memory 58 are housed separately from the rotor blade, either in the rotor blade hub, or in the nacelle, where they may be protected from lighting strikes by a suitable arrangement of lighting conductors or electrical shielding.

In ideal operating conditions, the air flow across the surface of the rotor blade will be laminar, resulting in little or no disturbance of the membrane 44. Turbulent air flow caused by the accumulation of matter on the surface of the rotor blade or by the pitch of the blade inducing stall like conditions will result in sudden and unpredictable movement of the membrane 44 and associated changes in phase of the light reflected back from the membrane 44 relative to the reference phase.

The processor 55 analyses the frequency of the light signals it receives from the light sensor 54 for each sensor 21 to determine the present quality of air flow across the blade. It may do this using any suitable mathematical processing techniques to determine the amount of variation in the light interference signal, such as that shown in FIG. 8. In other embodiments, it may use neural network techniques to develop a memory of the visual appearance of the intensity patterns for turbulent and laminar air flow, and determine the current air flow conditions by comparison with pre-developed model patterns. Such patterns may be stored in memory 58.

As well as identifying whether the results from an individual sensor 21 indicate turbulence, the controller 56 has the function of assessing the current operating performance of the wind turbine blades based on the results collected from the plurality of sensors 21 over time. The sensor may for example be used to give an exact picture of the movement of the inner or outer surface of the blade or component. In this way, the sensor system can be used to detect the self-resonance frequency of the blade. As before, if the resonance of the blade has changed, this may indicate that the blade is covered with ice, or other matter, or that the blade has been damaged, either due to delamination or due to cracks or other defects appearing in the material.

It will be appreciated that the processor 55 and the controller 56 may be provided in a single or in separate units.

The controller 56 preferably takes continuous or periodic readings from the turbulence sensors 21 to develop a time-log of changes in the air flow over the blade. In either case, in order to accurately determine the quality of air flow an intensity pattern such as that shown in FIG. 8 needs to be built up over a minimum period of time. Assuming that the wind is blowing sufficiently strongly, a measurement period of a few second to a several minutes may be sufficient. Longer measurement periods however can provide a greater degree of certainty for the assessment.

To detect the accumulation of unwanted matter on the wind turbine components, periodic measurements may for example only be required a limited number of times per day. In which case, the light sensors are activated for discrete periods of time, and subsequently deactivated when not required to be in use. Where the sensors are continuously activated, the processor divides the continuous readings into discrete time windows for each sensor.

The processor 55 receives the light intensity signal from each sensor for the measurement period, and stores this in memory 58 with an indication of the time period. Each signal is then analysed to determine whether or not it is characteristic of turbulent or laminar air flow, and the result of the determination logged. It will be appreciated that the result may be a discrete value, either a positive or a negative indication of turbulence, or may be a continuous value indicating the degree to which the air flow is turbulent.

At the start of operation of a wind turbine, the blades and other wind turbine components will be largely free of dirt, but depending on the time of year, and climate conditions, ice may or may not have accumulated. At installation therefore, and assuming the blades are not pitched to cause stall-like air flow, the readings from the sensors 21 should largely indicate laminar flow. Nevertheless, particular sensors at particular times may indicate turbulent air flow, as a result of instantaneous and unpredictable variations in the air flow. Such indications would be sporadic and without pattern.

Figure 12:
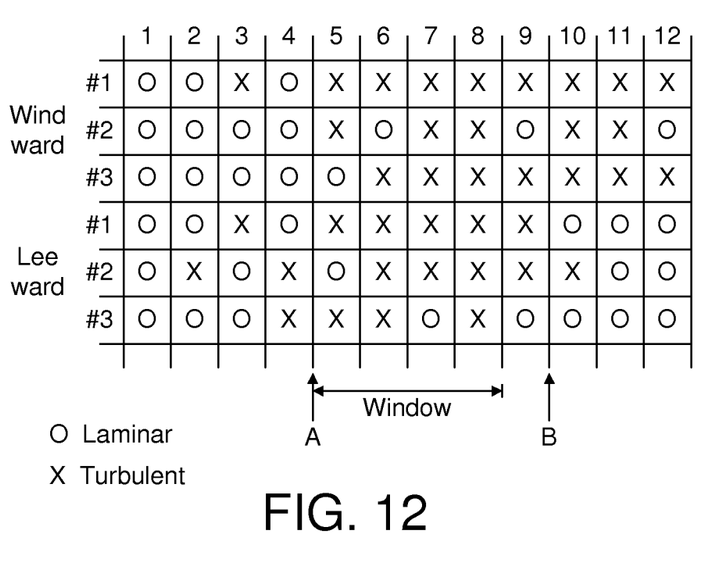
FIG. 12 is an illustration of a sensor results table used in a control and alarm system.

The results from the sensors are logged and monitored by the processor to determine larger scale changes that are indicative of problems with the component. For example, if in normal operation three sensors on a blade surface component occasionally and sporadically indicate turbulent air flow but largely give a reading consistent with laminar air flow, then a change in the system to a persistent reading of turbulence from two or more sensors might indicate that the air flow across the blade has been affected by the build up of matter, and that action needs to be taken. Such a condition is illustrated in FIG. 12, where sensor time periods are indicated by columns and individual sensor readings indicated by rows. In this diagram, two sets of three sensors located on the windward and leeward sides of a wind turbine blade are depicted.

The first four columns show an occasional turbulence detection from a sensor, but do not indicate any large scale trend. The columns after point A however show a permanent change to turbulent indications from the majority of sensors and are indicative of a problem with the blade condition. The processor may therefore detect such problems simply by counting the number of turbulence indications over a predetermined time period or window, say four or more. If a threshold count is passed, the processor issues an alarm indicating that attention is needed.

Preferably, the alarm function operates on a continuous basis such that if the turbulent conditions are no longer detected the alarm is cancelled. At point B for example, it is possible that the turbulence sensors on the leeward side of the blade will return to largely indicating a normal condition. As noted above turbulence can be a result of the blade pitch and not necessarily accumulation of unwanted matter. Thus, if turbulence is detected for an extended period of time, the processor can be configured to test the determination by reducing the blade pitch and reducing the likelihood that the turbulence is due solely to the blade angle. If doing so results in a cancellation of the alarm signal, the blades may be pitched into the wind as before to resume operation.

Increasing accumulation of matter on the blades is likely to lead to a reduced stall angle of the blades. Testing the blades by varying the pitch angle once a turbulent condition has been detected therefore provides an additional test of the extent to which matter has accumulated on the blades. If the stall angle of the blades is severely reduced by accumulated matter, then attention may be needed from a maintenance engineer.

In one example, in addition to comparing the indications of individual sensors on a blade, the processor 55 compares the results from one blade to those of another. Sub-optimal turbulence performance of one blade in comparison with the other blades may indicate that the mounting of the blade on the rotor hub needs adjustment, or that the blade is not performing as well, due to stress or other factors. The processor may, if persistent sub-optimal performance is detected, issue an alarm to draw attention to the blade condition.

The use of the optical vibration sensors described above in the blade condition monitoring implementation can be used to provide a blade pitch control mechanism. The processor 55 communicates with the pitch control unit 60 of the wind turbine control system and indicates a pitch control instruction based upon the number of sensors 21 indicating turbulent air flow. The pitch control system 60 also receives an input from a power monitor (not shown) that measures the output power being generated by the turbine. In normal use, the pitch controller increases the pitch at which the blades are angled into the wind in order to maximise the output power, and avoid making the pitch too large and inducing a stall condition.

Blade pitch control based solely on the output power can be slow in responding to changes in wind speed and direction. The input from processor 55 however provides a finer, more responsive level of control based on the immediate wind condition at the blade. Thus, where the number of sensors indicating turbulence exceeds a predetermined value, and continues to do so for a predetermined period of time, the controller 56 instructs the pitch controller 60 to reduce the pitch until the number of turbulence sensors 21 that indicate turbulence, falls below the predetermined number. In this way, the pitch of the blade can be controlled in real time and be responsive to the measured turbulence of the air flow across the blade.

In further examples, the data from the plurality of optical vibration sensors mounted on the blade surface can be used to monitor the performance of a wind turbine blade in real time from the perspective of the blades aerodynamic design. By transmitting data from different turbines to a central store for analysis, sufficient data could be collected about the air flow performance of the wind turbine blades, allowing them to be improved in future re-designs.

In alternative applications, the turbulence sensor described above can be applied to the control of further wind turbine rotor blade aerodynamic parameters such as rotor blade shape and rotor blade air flow. This will now be briefly described.

The shape of a rotor blade can be dynamically adjusted using a variety of techniques. To some extent these will change the air flow properties across the blade and by directly affecting the lift experienced by the blade will also affect the power generated. A number of techniques are discussed below:

1) Flaps and ailerons are hinged regions of the blade that can be adjusted as required to change the flow of air over the blade surface. Although, these are typically located at the trailing edge of the turbine blade, they could also be located on other parts of the blade as required. Their effect in this case would be more like that of a spoiler acting to reduce lift.

2) Micro tabs are actuable elements located in the blade or on the surface that can be rapidly extended into the air flow to change its dynamic properties. They can be used to reduce stress on the blade, dampen vibrations as well as increasing lift.

3) Slots and slats in the blade can be used in the same way as 1) and 2) above. In other designs, concave or convex bumps on the blade surface can also be activated to change air flow.

4) Fluid filled cavities or voids inside the blade can be used to change the shape of the blade as they are filled with fluid or evacuated. In some designs, air can be sucked into the blade or expelled from it to change the air flow. Variable vortex generators in the blade fall into this category.

5) Deformation of the blade shape or variation in the blade span can also be achieved by control of the underlying structural supports.

The sensor described above is relatively inexpensive to produce and is easy to mount. Thus, sensor systems comprising a large number of sensors can be installed relatively easily into both new and existing turbines. Furthermore, the membrane may be painted the same colour as the surrounding component surface to ensure that the visual appearance of the wind turbine is not impaired. Painting the area after mounting the sensor also has the effect that no moisture can enter the blade along the side of the sensor cavity 40 and 41 and blade 5.

A sensor system like that described above in connection with a blade sensor system can be used on any wind energy power plant component, in order to measure the operating parameters of the plant. In particular, it may also be used to monitor the internal electrical and machinery components in the nacelle. In that context, a turbulence condition as described above corresponds to an abnormal sound emitted by a component, and the sensor can operate by monitoring changes between the normal and abnormal states. An abnormal 'turbulent' like condition can be detected in a number of ways, such as with reference to the frequency of the detected sound, indicated by the movement of the membrane, or simply with reference to the pattern of movement of the sensor membrane. Under normal operating conditions, the membrane is likely to move in a periodic or predictable fashion, given the operation of the generator and other components, subject to electrical and electrical machinery switching in and out in the course of its normal operation. The movement of the membrane under normal conditions will therefore have a recognisable pattern, and deviation from the pattern can be used to indicate an alarm state.

The above description is intended only to be illustrative of the invention defined by the claims. Alternative techniques for implementing the invention will occur to the skilled person in the art.

As wind energy power plants are susceptible to lightning strikes, the preferred device employs optical fibres as both light source and light detector in the sensor housing. In alternative embodiments however, opto-electronic devices such as light emitting diodes and photo detectors may be used directly inside the sensor housing, with appropriate electrical and signalling connections to a controller and power source. In certain embodiments it may of course be appropriate to install the control electronics and power systems locally or in the sensor itself.

Additionally, although the discussion has largely considered use of the sensors on wind turbine blades, the sensors could be installed on any wind turbine component. Further, although the sensor system is intended to indicate whether unwanted matter, such as dirt or ice has accumulated on the blade, it will be appreciated that the sensor system can be used to indicate the general condition of the blade surface.

Other devices for demodulating the interference signal to extract the envelope will be understood to those skilled in the art.

The invention claimed is:

1. A wind energy power plant comprising:
    a first light source for emitting light at a first frequency, wherein the first light source is selected from the group consisting of a tunable laser and a light emitting diode:
    a second light source for emitting light at a second frequency, wherein the second light source is selected from the group consisting of a tunable laser and a light emitting diode, and wherein the first and second frequencies are different, and differ by a frequency df; and
    an optical vibration sensor, including:
        a sensor cavity;
        a sensor membrane, in the cavity and integral to a surface of a wind energy power plant component;
        at least a first optical fibre connected to the first light source and terminating in the sensor cavity, arranged such that light emitted from the first optical fibre is incident on the sensor membrane;
        a light receiving optical fibre, being either the first optical fibre or a further optical fibre for receiving light that has been emitted from the first optical fibre and reflected from the sensor membrane;
        an optical coupler coupled to the light receiving optical fibre for interfering the reflected light with the light emitted from the second light source to produce an output sensor interference signal; and
        a detector for extracting from the output sensor interference signal the interference component of the signal that corresponds to the difference in frequency df, and based on changes in the difference in frequencies df, providing an output indicating movement of the sensor membrane.

2. The wind energy power plant of claim 1, wherein the wind energy power plant component surface has at least one side that is exposed to the air outside of the wind energy power plant.

3. The wind energy power plant of claim 1, wherein the wind energy power plant component surface is that of one or more wind turbine blades.

4. The wind energy power plant of claim 3, comprising a plurality of sensor cavities on the windward and leeward sides of the one or more wind turbine blades.

5. The wind energy power plant of claim 3, comprising a processor and a memory for analysing the variations in the output sensor interference signal pattern over a predetermined period of time to determine whether the air flow over the wind energy power plant component surface is turbulent.

6. The wind energy power plant of claim 5, wherein the memory is arranged to record the output indicating movement of the wind energy power plant component surface over a period of time, and the processor is arranged to determine a condition of the component surface based on changes in the outputs over the time period.

7. The wind energy power plant of claim 5, comprising a controller for receiving data from the plurality of sensors, and based on the detection of turbulent air flow controlling an aerodynamic parameter of a wind turbine rotor blade.

8. The wind energy power plant of claim 7, wherein the aerodynamic parameter comprises at least one of a pitch angle of the rotor blade and a shape of the rotor blade.

9. The wind energy power plant of claim 8, wherein the controller, modifies the aerodynamic parameter when a predetermined number of sensors indicate turbulent air flow.

10. The wind energy power plant of claim 1, wherein the sensor membrane is formed of a different material to that from which the surface of the wind energy power plant component is formed.

11. The wind energy power plant of claim 1, wherein the detector comprises a tracking device for tracking the amplitude envelope of the output sensor interference signal and outputting an electrical signal.

12. The wind energy power plant of claim 11, wherein the tracking device is a PIN diode.

13. The wind energy power plant of claim 1, wherein the detector detects the variation in df as the interference component.

14. The wind energy power plant of claim 1, wherein the detector detects as the interference component the difference in phase between the reflected light and the light emitted from the second light source.

15. The wind energy power plant of claim 1, further comprising:
a second optical coupler for receiving the light from the first light source, before reflection from the surface of the wind turbine component, and for interfering the light with the light emitted from the second light source to produce an output reference interference signal; and
a comparator for comparing the output sensor interference signal with the output reference interference signal.

16. The wind energy power plant of claim 1, wherein the optical vibration sensor comprises an electrically insulated housing containing at least the first and second light sources and the detector.

17. The wind energy power plant of claim 1, wherein the wind energy power plant has a nacelle, housing one or more electrical or mechanical components, and the surface of the wind energy power plant component is located in the interior of the nacelle.

18. The wind energy power plant of claim 17, comprising a processor and memory for storing the output indicating movement of the wind energy power plant component surface, and analysing the output to give an indication of the operating condition of at least one of the one or more electrical or mechanical components.

19. The wind energy power plant of claim 17, wherein the optical vibration sensor is an accelerometer.

20. A wind energy power plant having an optical vibration sensor, comprising:
a sensor cavity comprising a sensor membrane integral to the surface of a wind energy power plant component, wherein the wind energy power plant component comprises at least one of a turbine blade, a nacelle, a hub, and a tower;
a first optical fibre coupled to a first light source for emitting light at a first frequency, wherein the first light source is selected from the group consisting of a tunable laser and a light emitting diode, and wherein the light emitted from the first optical fibre is incident on the sensor membrane;
a second light source for emitting light at a second frequency, wherein the second light source is selected from the group consisting of a tunable laser and a light emitting diode, and wherein the first and second frequencies are different, and differ by a frequency df;
an optical coupler operable to interfere the light incident on the sensor membrane with the light emitted from the second light source to produce an output sensor interference signal; and
a detector for extracting from the output sensor interference signal the interference component of the signal that corresponds to the difference in frequency df, and based on changes in the difference in frequencies df, providing an output indicating movement of the wind energy power plant component surface.

* * * * *